US007583860B2

(12) United States Patent
Kuo et al.

(10) Patent No.: US 7,583,860 B2
(45) Date of Patent: Sep. 1, 2009

(54) METHOD FOR PRODUCING ENHANCED-RESOLUTION IMAGE BY USE OF A PLURALITY OF LOW-RESOLUTION IMAGES

(75) Inventors: Yu-Chuan Kuo, Taipei (TW); Chien-Yu Chen, Taipei (TW); Chiou-Shann Fuh, Taipei (TW); Chao-Yang Kao, Taipei (TW)

(73) Assignee: Inventec Appliances Corporation, Taipei (TW)

( * ) Notice: Subject to any disclaimer, the term of this patent is extended or adjusted under 35 U.S.C. 154(b) by 348 days.

(21) Appl. No.: 10/758,088

(22) Filed: Jan. 16, 2004

(65) Prior Publication Data

US 2004/0156561 A1 Aug. 12, 2004

(30) Foreign Application Priority Data

Feb. 21, 2003 (TW) .............................. 92103612 A

(51) Int. Cl.
*G06K 9/32* (2006.01)
(52) U.S. Cl. ...................................... 382/300; 382/255
(58) Field of Classification Search ................ 382/300, 382/254; 348/699; 375/240.01
See application file for complete search history.

(56) References Cited

U.S. PATENT DOCUMENTS

| 5,696,848 | A | * | 12/1997 | Patti et al. ..................... 382/254 |
| 5,872,604 | A | * | 2/1999 | Ogura ........................ 348/699 |
| 5,969,848 | A | | 10/1999 | Lee et al. ..................... 359/298 |
| 6,330,344 | B1 | | 12/2001 | Kondo et al. ................ 382/107 |
| 6,650,704 | B1 | * | 11/2003 | Carlson et al. ......... 375/240.01 |

FOREIGN PATENT DOCUMENTS

| EP | 1 001 374 A2 | 5/2000 |
| JP | 4172778 | 6/1992 |
| JP | 5260264 | 10/1993 |
| JP | 11098395 | 4/1994 |
| JP | 8018840 | 1/1996 |
| JP | 8263639 | 10/1996 |

OTHER PUBLICATIONS

M. Irani and S. Peleg; "Improving Resiolution by Image Registration"; CVGIP; Graphical Models and Image Proc.; 1991; vol. 53, pp. 231-239.
R.Y. Tsai and T.S. Huang, "Multiframe Image Restoration and Registration", in advances in Computer Vision and Image Processing, vol. 1 (T.S. Huang, ed), Greenwich, CT: Jai Press, 1984, pp. 317-339.

(Continued)

*Primary Examiner*—Jingge Wu
*Assistant Examiner*—Tsung-Yin Tsai
(74) *Attorney, Agent, or Firm*—Troxell Law Office, PLLC

(57) ABSTRACT

The invention is to provide a method that reconstructs enhanced-resolution images with improved super-resolution algorithms, which is based on an iterative method and employs our suggested initial interpolation, robust image registration, automatic image selection, and further image enhancement post-processing. According to the method of the invention, the reconstruction of enhanced-resolution image can be quickly achieved not only by low-resolution image sequences associated with a moving object but also by low-resolution image sequences associated with a stationary scene.

5 Claims, 8 Drawing Sheets

OTHER PUBLICATIONS

P. Cheeseman, B. Kanefsky, R. Kruft, J. Stutz, and R. Hanson, "Super-Resolved Surface Reconstruction from Multiple Images," NASA Technical Report FIA-94-12, 1994.

A.M. Tekalp, M.K. Ozkan, and M.I. Sezan, "High-Resolution Image Reconstruction for Lower-Resolution Image Sequences and Space-Varying Image Restoration," IEEE International Conference on Acoustics, Speech, and Signal Processing, San Francisco, CA, 1992, vol. III, pp. 169-172.

R.C. Gonzalez and R.E. Woods, Digital Image Processing, Addison-Wesley, Reading, MA, 1992.

W.K. Pratt, Digital Image Processing, $2^{nd}$ Ed., Wiley, New York, 2001.

"Hi-resolution Modeling of 3D Environment Using Omnidirectional Image Sensor," Hajime Nagahara et al., The Institute of Electronics, Information and Communication Engineers, 2001, pp. 39-46.

"Resolution Improving Method from a Sub-pixel Displaced Omnidirectional Image Sequence," Hajime Nagahara et al., vol. 14, No. 6, pp. 322-329, 2001.

Super-Resolution of Omni Camera Image Using Spatio-Temporal Analysis, Hiroshi Kawasaki et al., D-II, vol. J84-D-II, No. 8, pp. 1891-1902, 2001.

Probabilistic Relaxation Method in Multi-Resolusion Space for Regularization of Correspondence Detection Problem, Jun Matsuo et al., The Institute of Electronics, Information and Communication Engineers, 2001, pp. 5-10.

* cited by examiner

METHOD FOR PRODUCING ENHANCED-RESOLUTION IMAGE BY USE OF A PLURALITY OF LOW-RESOLUTION IMAGES

BACKGROUND OF THE INVENTION

1. Field of the Invention

This present invention relates to an image processing method, and more particularly to a method for producing an enhanced-resolution image by use of a plurality of low-resolution images. With respect to the technology background of the method of the invention, please refer to the following references:

[1] M. Irani and S. Peleg, "Improving Resolution by Image Registration," CVGIP:Graphical Models and Image Proc., 1991, Vol. 53, pp. 231-239;

[2] R. Y. Tsai and T. S. Huang, "Multiframe Image Restoration and Registration," in Advances in Computer Vision and Image Processing, Vol. 1 (T. S. Huang, ed.), Greenwich, CT: Jai Press, 1984, pp. 317-339;

[3] P. Cheeseman, B. Kanefsky, R. Kruft, J. Stutz, and R. Hanson, "Super-Resolved Surface Reconstruction from Multiple Images," NASA Technical Report FIA-94-12, 1994;

[4] A. M. Tekalp, M. K. Ozkan, and M. I. Sezan, "High-Resolution Image Reconstruction for Lower-Resolution Image Sequences and Space-Varying Image Restoration," IEEE International Conference on Acoustics, Speech, and Signal Processing, San Francisco, Calif., 1992, Vol. III, pp. 169-172;

[5] R. C. Gonzalez and R. E. Woods, Digital Image Processing, Addison-Wesley, Reading, Mass., 1992;

[6] W. K. Pratt, Digital Image Processing, 2nd Ed., Wiley, New York, 2001;

[7] U.S. Pat. No. 6,330,344; and

[8] U.S. Pat. No. 5,969,848.

2. Description of the Prior Art

Due to environmental constraints and resolution of image sensors, sometimes we can only get low-resolution images. In order to improve the image quality and resolution seen by human eyes, more than one input image is required. With image sequences, a blurring scene, a dim figure, or an unclear object of poor quality can be reconstructed to an enhanced-resolution output image and can then be easily observed and recognized.

Prior researches regarding the reconstruction of an enhanced-resolution image by use of low-resolution images are mainly divided into iterative methods [1], frequency domain methods [2], and Bayesian statistical methods [3]. In aforesaid methods, so far, the iterative algorithm that has been developed by Irani [1] in 1991 and reconstructs an enhanced-resolution image mainly by image registration, is still most reliable in the prior arts regarding the reconstruction of an enhanced-resolution image. The iterative method mainly consists of three phases: initial guess, imaging process, and reconstruction process. The procedures of the three phases of the iterative method will be described in details in the detailed description of the invention.

However, it is noticed that the iterative method will consume more computation time as the magnification factor predetermined in the iterative method becomes larger, i.e., the size of the reconstructed image becomes larger. Typically, the runtime of image reconstruction by the iterative method is on the order of hours and depends on the performance of computer system.

Therefore, an objective of the invention is to provide a method for reconstructing an enhanced-resolution image with improved enhanced-resolution algorithms, which is based on Irani's iterative method and employs well-suggested initial interpolation, automatic image selection and robust image registration. Further, the enhanced-resolution image reconstructed by the method of the invention can be performed by an image enhancement post-process to enhance image quality thereof.

Whereas the conventional systems of the reconstruction of enhanced-resolution images work well only as the low-resolution image sequences are captured by moving a stationary camera in a constant displacement in relation to the whole scene, i.e., the targets, needed to be reconstructed, associate with stationary scenes. Therefore, another objective of the invention is to provide a method for reconstructing an enhanced-resolution image, which work well not only for the conditions as the targets, needed to be reconstructed, associate with stationary scenes, but also for the conditions as the targets, needed to be reconstructed, associate with moving objects.

SUMMARY OF THE INVENTION

An objective of the invention is to provide a method for reconstructing an enhanced-resolution image with improved enhanced-resolution algorithms. Moreover, the method of the invention, based on the iterative method, utilizes well-suggested initial interpolation, automatic image selection and robust image registration. Further, the enhanced-resolution image reconstructed by the method of the invention can be performed by an image enhancement post-process to enhance image quality thereof.

Another objective of the invention is to provide a method for reconstructing an enhanced-resolution image, which work well not only for the conditions as the targets, needed to be reconstructed, associate with stationary scenes, but also for the conditions as the targets, needed to be reconstructed, associate with moving objects.

According to a preferred embodiment of the invention, M first low-resolution images are used to reconstruct an enhanced-resolution image. The M first low-resolution images associate with a scene. Each of the M first images is represented by a set of uniformly sampled and quantized pixels. A relationship of a magnification factor exists between the enhanced-resolution image and each of the M first images. First, the M first images are stored. Then, one is selected from the M first images as a prototype image, and the non-selected (M-1) first images are referred to being as (M-1) second images. Based on the magnification factor, extra pixels are interpolated into the set of pixels of the prototype image, and then each value of extra pixels is calculated according to the values of neighbor pixels thereof to produce an interpolated prototype image. The respective translations, which each exists between each of the (M-1) second images and the interpolated prototype image, are also calculated. The translations of the (M-1) second images are divided by the magnification factor, respectively, to obtain the modulus with respect to the translations of the (M-1) second images. Based on a criteria, one is selected from the second images whose related modulus are the same. The selected second images together with the rest of the second images, whose related modulus are not the same, are referred to being as N third images where N is equal to or less than (M-1). The interpolated prototype image is down-sampled N times according to the respective translations between each of the N third images and the interpolated prototype image to produce N fourth images which each corresponds to one of the N third images.

The difference between each of the N third images and the corresponding fourth image thereof is calculated. The values of the pixels of the interpolated prototype image are adjusted according to an average of the differences between each of the N third images and the corresponding fourth image thereof. The steps of down-sampling and of adjusting the values of the pixels of the interpolated prototype image are repeated until the values of the pixels of the interpolated prototype image converge to a satisfactory result. Finally, the interpolated prototype image whose values of pixels converge to the satisfactory result is referred to being as the enhanced-resolution image.

The advantage and spirit of the invention may be understood by the following recitations together with the appended drawings.

BRIEF DESCRIPTION OF THE APPENDED DRAWINGS

Figure 3:
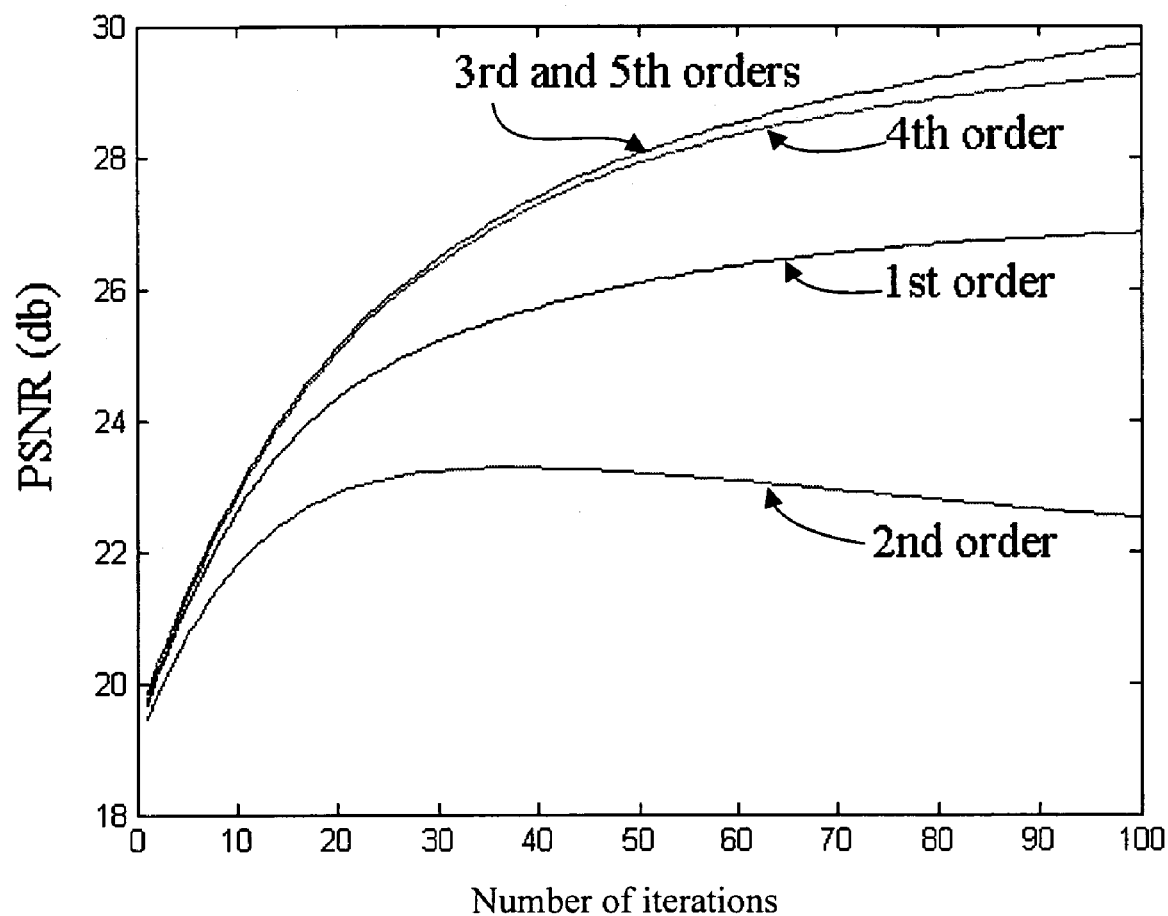

FIG. 3 evaluates the performance of interpolation ways of different orders by Peak Signal-to-Noise Ratio (PSNR) between the original image and reconstructed images.

Figure 4A:
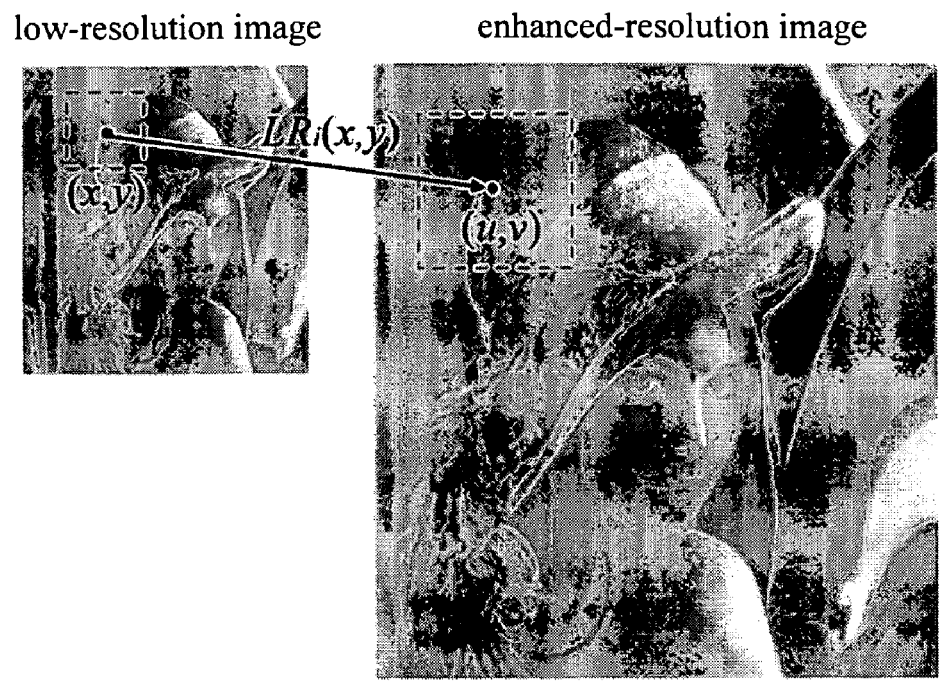

FIG. 4A shows schematically the image registration using local matching technique.

Figure 4B:
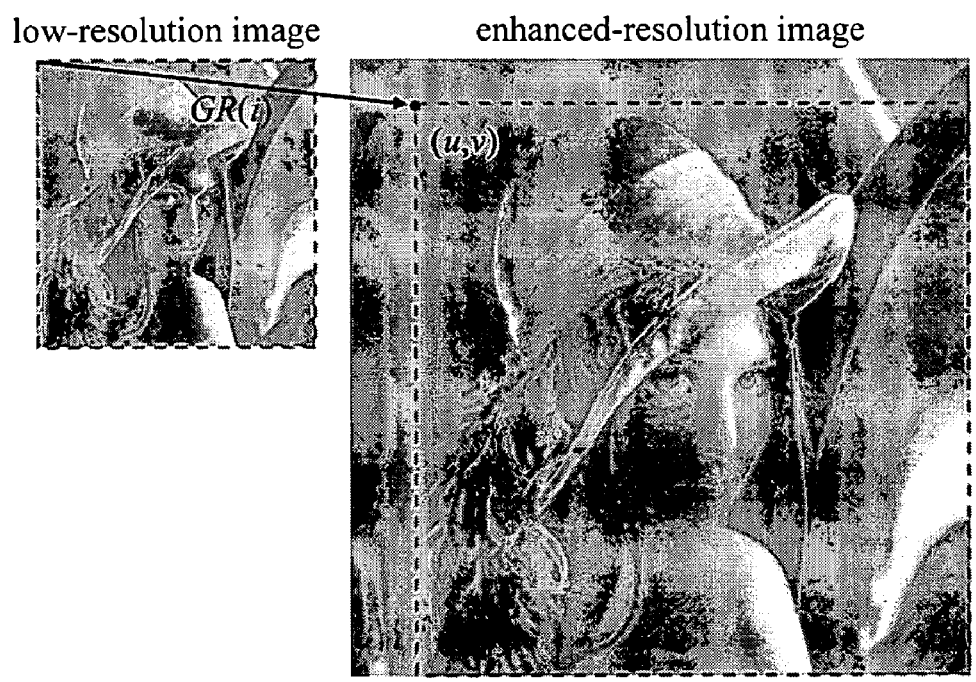

FIG. 4B shows schematically the image registration using global matching technique.

FIG. 5A through FIG. 5D show the results about the first case of reconstructing enhanced-resolution image according to the method of the invention.

FIG. 6A through FIG. 6D show the results about the second case of reconstructing enhanced-resolution image according to the method of the invention.

Figure 7:
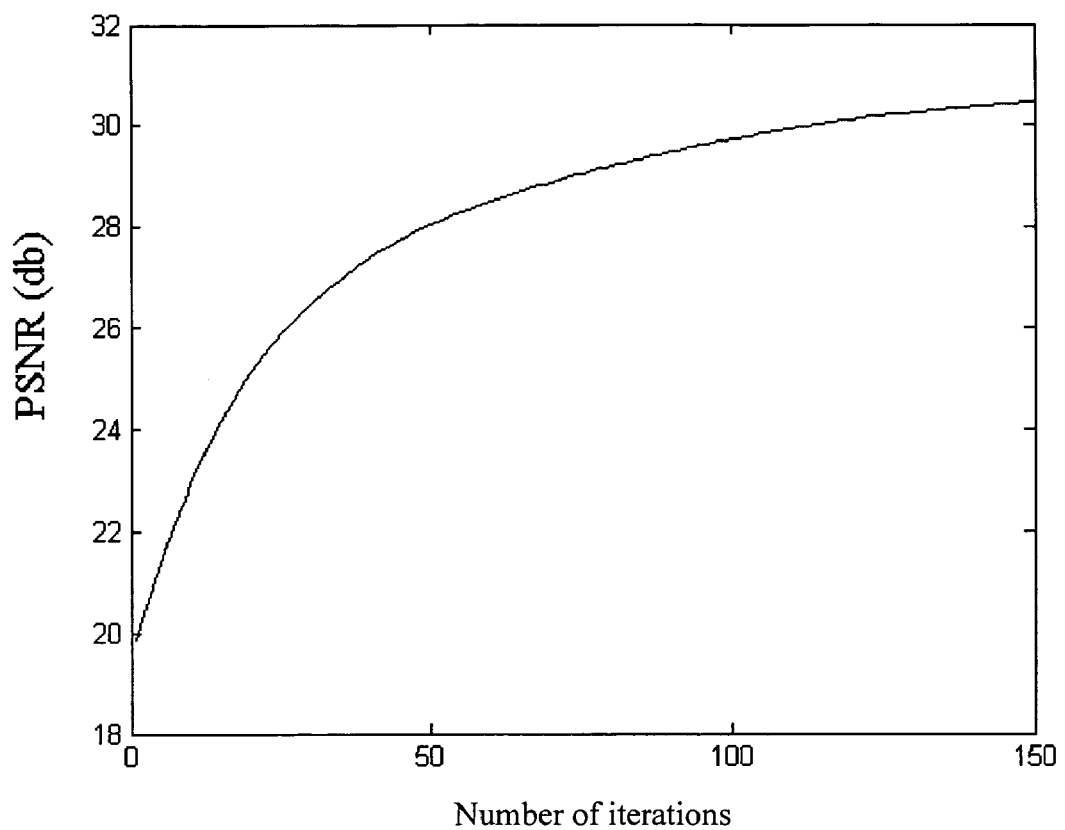

FIG. 7 shows PSNR regarding the second case as the number of iterations grows.

FIG. 8A through FIG. 8D show the results about the third case of reconstructing enhanced-resolution image according to the method of the invention.

DETAILED DESCRIPTION OF THE INVENTION

The invention is to provide a method for reconstructing an enhanced-resolution image with improved enhanced-resolution algorithms, which is based on Irani's iterative method and employs well-suggested initial interpolation, automatic image selection and robust image registration. The enhanced-resolution image, reconstructed by the method of the invention, can further be performed by an image enhancement post-process to enhance image quality thereof. Hereinafter, the steps of the method according to the invention and preferred embodiments of the invention will be described in details to point out the spirit, characteristics and advantages of the invention. Those will also be illustrated as follows how to reconstruct an enhanced-resolution image associated with a stationary scene and how to reconstruct an enhanced-resolution image associated with a moving object.

Figure 1:
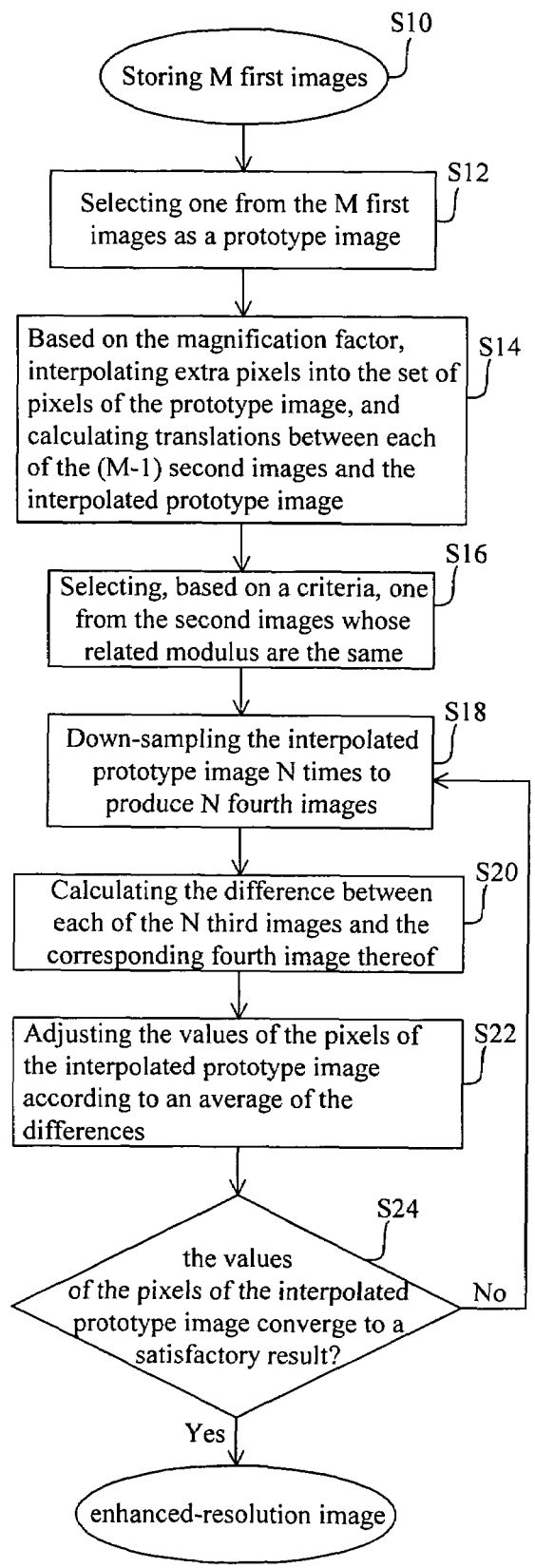
FIG. 1 is a flowchart showing workflow of the method according to the invention.

Referring to FIG. 1, FIG. 1 is a flowchart showing the workflow of the method according to the present invention. It is noted that M first low-resolution images are used to produce an enhanced-resolution image in the method according to the invention. Moreover, the M first low-resolution images associate with the same scene, i.e., the M first low-resolution images all are captured from the same scene. Each of the M first images is represented by a set of uniformly sampled and quantized pixels. A relationship of a user-desired magnification factor exists between the enhanced-resolution image and each of the M first images.

At the start, the method, according to the invention, performs step S10 to store the M first images.

The method of the invention then performs step S12 to select one of the M first images as a prototype image, and to refer the non-selected (M-1) first images to being as (M-1) second images.

Subsequently, the method of the invention performs step S14. The initial guess phase of the method of the invention is achieved during step S14. Step S14 is to interpolate extra pixels into the prototype image based on the magnification factor. In step S14, the values of the extra pixels are calculated according to the values of neighbor pixels thereof to produce an interpolated prototype image, and the respective translations which each exists between each of the (M-1) second images and the interpolated prototype image are also calculated.

After step S14, step S16 is performed. The automatic image selection phase of the method of the invention is achieved during step S16. Step S16 is to divide the translations of the (M-1) second images by the magnification factor, respectively, to obtain the modulus with respect to the translations of the (M-1) second images. Step S16 is also to select, based on a criteria, one from the second images whose related modulus are the same. The selected second images together with the rest of the second images, whose related modulus are not the same, are referred to being as N third images where N is equal to or less than (M-1).

Afterward, step S18 is performed to down-sample, according to the respective translation between each of the N third images and the interpolated prototype image, the interpolated prototype image N times to produce N fourth images. Each of the N fourth images corresponds to one of the N third images.

After step S18, step S20 is performed to calculate the difference between each of the N third images and the corresponding fourth image thereof.

Then, step S22 is performed to adjust the values of the pixels of the interpolated prototype image according to an average of the differences calculated in Step 20.

Finally, step S24 is performed to determine if the values of the pixels of the interpolated prototype image converge to a satisfactory result. If NO in step S24, steps S18 through S22 are repeated. In the result, the interpolated prototype image, whose values of pixels converge to the satisfactory result, is referred to being as the enhanced-resolution image.

In a preferred embodiment, step S18 is implemented according to the following formula:

$$g_k^{(n)} = (T_k(f^{(n)}) \cdot h) \downarrow s,$$

wherein $g_k^{(n)}$ is the kth forth image at the nth down-sampling process, $f^{(n)}$ is the interpolated prototype image been adjusted n times, h is the blurring operator defined by a point-spread-function, $T_k$ is the transformation operator with respect to the translation between the kth third image and the interpolated prototype image, $\downarrow s$ is the down-sampling operator.

In a preferred embodiment, Step S18 and Step S22 are implemented according to the following formula:

$$f^{(n+1)} = f^{(n)} + \frac{1}{K}\sum_{k=1}^{K} T_k^{-1}(((g_k - g_k^{(n)})\uparrow s)\cdot p),$$

wherein $f^{(n+1)}$ is the interpolated prototype image to be adjusted at (n+1) time, K is the number of the third images been calculated, $g_k$ is the kth third image, p is the de-blurring operator, $T_k^{-1}$ is the inverse transformation operator with respect to the translation between the kth third image and the interpolated prototype image, ↑s is the up-sampling operator.

It is noted that the initial guess phase will significantly affect the of the computer system as the iterative method is used to reconstruct an enhanced-resolution image. That is, if a better initial guess is applied, great amount of computation time will be saved. Because the initial guess is performed merely once at the beginning of the process, the complexity of the whole iterative method does not depend on the complexity of the initial guess, which is based on the interpolation techniques. The difference between these interpolation ways of different orders just is that the numbers of neighboring pixels used for the calculation of the computation process are different. Hereinafter, a third order interpolation way will be taken as an example to illustrate the procedures of the interpolation ways.

The third order interpolation way, or called the cubic interpolation way, considers 4 unknown variables. On assumption, the interpolation function is: $y=f_3(x)=ax^3+bx^2+cx+d$, and the known neighboring pixels include (−1,A), (0,B), (1,C), and (2,D). Then, the following formulae can be conducted:

$$\begin{pmatrix} A \\ B \\ C \\ D \end{pmatrix} = \begin{pmatrix} -1 & 1 & -1 & 1 \\ 0 & 0 & 0 & 1 \\ 1 & 1 & 1 & 1 \\ 8 & 4 & 2 & 1 \end{pmatrix} \cdot \begin{pmatrix} a \\ b \\ c \\ d \end{pmatrix}$$

$$\Rightarrow \begin{pmatrix} a \\ b \\ c \\ d \end{pmatrix} = \begin{pmatrix} -1 & 1 & -1 & 1 \\ 0 & 0 & 0 & 1 \\ 1 & 1 & 1 & 1 \\ 8 & 4 & 2 & 1 \end{pmatrix}^{-1} \cdot \begin{pmatrix} A \\ B \\ C \\ D \end{pmatrix}$$

$$= \begin{pmatrix} -0.1667 & 0.5 & -0.5 & 0.1667 \\ 0.5 & -1 & 0.5 & 0 \\ -0.3333 & -0.5 & 1 & -0.1667 \\ 0 & 1 & 0 & 0 \end{pmatrix} \cdot \begin{pmatrix} A \\ B \\ C \\ D \end{pmatrix}$$

Figure 2A:
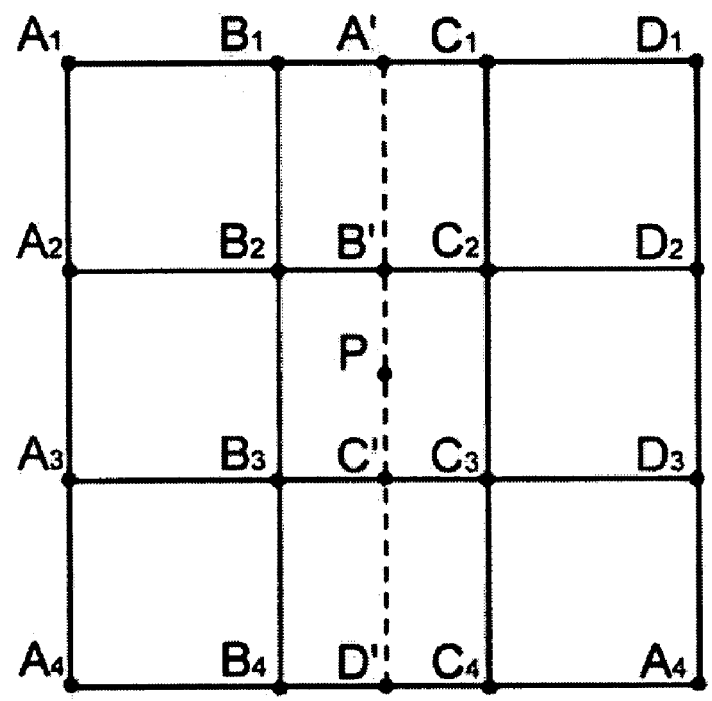
FIG. 2A and FIG. 2B are schematic diagrams showing the calculation of P value by use of a third-order interpolation way.
Figure 2B:
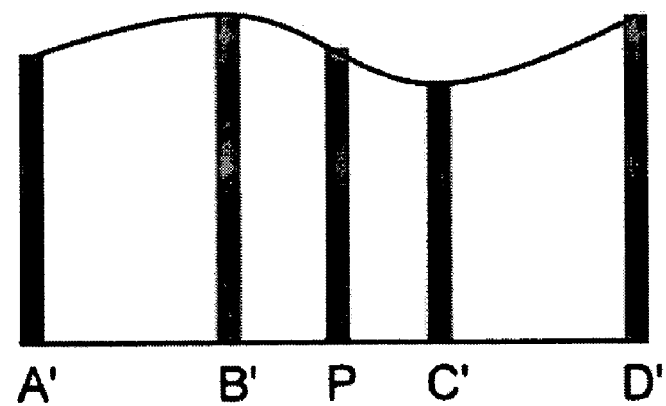

Referring to FIG. 2A and FIG. 2B, the procedures of the third order interpolation way are further illustrated. As shown in FIG. 2A, in order to interpolate the value of the pixel P in a two-dimension image, the values of pixels A', B', C' and D' are computed previously. The known values of pixels A1, B1, C1, and D1 are used to determine the coefficients of the third order function $f_3(x)$. Then, the value of pixel A' is interpolated by use of a one-dimension interpolation. Similarly, the values of pixels B', C' and D' are interpolated according to the values of pixels Ai, Bi, Ci and Di, as i=2, 3, and 4. Finally the value of pixel P is computed with the one-dimension interpolation in the vertical direction as demonstrated in FIG. 2A. As shown FIG. 2B, the third order interpolation way with one-dimension interpolation is used to determine the value of pixel P according to the known values of pixels A', B', C' and D'.

In the same way, in two-dimension interpolation algorithm, the coefficients of $f_n(x)$ regarding those interpolation ways of other orders can also be solved. It has been observed that the interpolation ways of different orders result in different initial-guess images and different convergence rates of image quality as the number of iteration grows. By selecting the most appropriate order of interpolation, the best results of iterative method will be achieved, since the initial guess phase has a great influence on the performance of image registration and on the necessary number of iterations to achieve the peak result of image. In an experiment, the performances about these interpolation ways of different orders are evaluated by Peak Signal-to-Noise Ratio (PSNR) between the original image and reconstructed images. The experimental results are shown in FIG. 3. As shown in FIG. 3, in most situations, the third order interpolation way ranks the best choice of initial guess if both complexity and reconstructed image quality are concerned. The method according to the invention prefers to use only the first order interpolation, the third order interpolation, or the fifth order interpolation.

In a preferred embodiment, while the (M-1) second images are the low-resolution image sequences associated with a moving object, the translation ($LT_i$), in step S14, between the ith second image and the interpolated prototype image is calculated according to the following steps of:
(a) assigning at least one interesting point $P_i(xy)$ on the ith second image, each interesting point corresponding to a local window (w) and a point (u,v) on the interpolated prototype image;
(b) calculating an absolute difference (LAD (x,y;u,v)) between each interesting point $P_i(xy)$ and the corresponding point (u,v) thereof according to the following formula:

$$LAD_i(x, y; u, v) = \sum_{(m,n)\in w} |I_i(x+m, y+n) - I_o(u+m, v+n)|;$$

(c) calculating a minimum ($LR_i(x,y)$) of the absolute difference $LAD_i(x,y;u,v)$ calculated in step (b) according to the following formula:

$$LR_i(x, y) = \underset{(u,v)}{\operatorname{argmin}} LAD_i(x, y; u, v); \text{ and}$$

(d) calculating the translation ($LT_i$) with respect to each interesting point $P_i(x,y)$ according to the following formula:

$LT_i(x,y)=LR_i(x,y)-(x,y)\cdot$magnification factor.

In this preferred embodiment, in order to get more accurate image registration and then reconstruct the enhanced-resolution image of a moving object, the interesting points are selected under the following constraints.

a. The gradient at the interesting point should be larger than a threshold.

b. For each interesting point on a low-resolution image, the complexity corresponding to the corresponding point on the simulated enhanced-resolution image should be higher than the complexity of the peripheral points.

c. The translation between each interesting point and the corresponding point should not be zero.

The technology mentioned above is also called the local matching technology as shown in FIG. 4A.

In another preferred embodiment, while the (M-1) second images are the low-resolution image sequences associated with a stationary object, the translation ($LT_i$), in step S14, between the ith second image and the interpolated prototype image is calculated according to the following steps of:
(a) calculating an absolute difference (GAD(u,v)) with respect to the ith second image according to the following formula:

$$GAD_i(u, v) = \sum_{(x,y)\in i} |I_i(x, y) - I_o(u + x, v + y)|,$$

wherein the point (u,v) is a corresponding position point of the interpolated prototype image which is corresponding to a start point of the ith second image corresponds to;
(b) calculating a minimum (GR(i)) of the absolute difference (GAD(u,v)) calculated in step (a) according to the following formula:

$$GR(i) = \underset{(u,v)}{\mathrm{argmin}} GAD_i(u, v),$$

and considering GR(i) as $LT_i$.

The above-mentioned technology is also called the global matching technology as shown in FIG. 4B.

In step S16, the objective of the automatic image selection is to select a minimal number of useful low-resolution images for the proceeding image processes such as image registration. This way can reduce unnecessary calculation to accelerate the reconstruction of the enhanced-resolution image. The principles of selecting useful low-resolution images from the original low-resolution images, associated with a stationary scene or a moving object, are different. The different principles will be illustrates as follows.

In an embodiment, while the (M-1) second images are the low-resolution image sequences associated with a moving object, the principle of selecting useful low-resolution images in step S16 is that for two second images i, j having the same modulus and $(u_i,v_i)=T_i$, $(u_j,v_j)=T_j$, the second image i is selected if $GAD_i(u_i,v_i)<GAD_j(u_j,v_j)$.

In an embodiment, while the (M-1) second images are the low-resolution image sequences associated with a stationary scene, the principle of selecting low-resolution images in step S16 is that for two second images i and j having the same modulus, and $(u_i,v_i)=T_i$ and $(u_j,v_j)=T_j$, the second image i is selected if $\sigma_i^2<\sigma_j^2$. The variance of $\{LT_i(x,y)|(x,y)\in I_i\}$ is defined as $\sigma_i^2=\sigma_{xi}^2+\sigma_{yi}^2$. Symbol $\sigma^2_{xi}$ and $\sigma_{yi}^2$ are the variances of the translation values along x and y axes respectively.

Referring to Table 1, Table 1 indicates the performances of a system applying the method according to the invention. This system is equipped with a Intel Pentium III CPU and 128 MB RAMs. In this case, five 62×62 low-resolution images are used to reconstruct an enhanced-resolution image based on a magnification factor of 3. In Table 1, the results of the system executing automatic image selection or not are also listed.

TABLE 1

| | | Computation Time (seconds) | PSNR (db) |
|---|---|---|---|
| Local Matching Technique | With Image Selection | 155.4 | 26.78 |
| | Without Image Selection | 582.4 | 26.66 |
| Global Matching Technique | With Image Selection | 75.8 | 26.78 |
| | Without Image Selection | 496.2 | 26.66 |

According to the results in Table 1, it is evident that the system executing the automatic image selection proposed by the invention can reduce the computation time significantly. Some cases of image reconstruction using the method of the invention will described as follows to further prove the performance of system applying the method of the invention.

Figure 5A:
Figure 5B:
Figure 5C:
Figure 5D:

Referring to FIGS. 5A through FIG. 5D, a first case is illustrated. FIG. 5A shows one of low-resolution images. FIG. 5B shows the result after the initial guess phase. FIG. 5C shows the reconstructed image after 100 iterations. FIG. 5D shows the reconstructed enhanced-resolution image with high-pass filtering process to sharpen edge thereof.

Figure 6A:
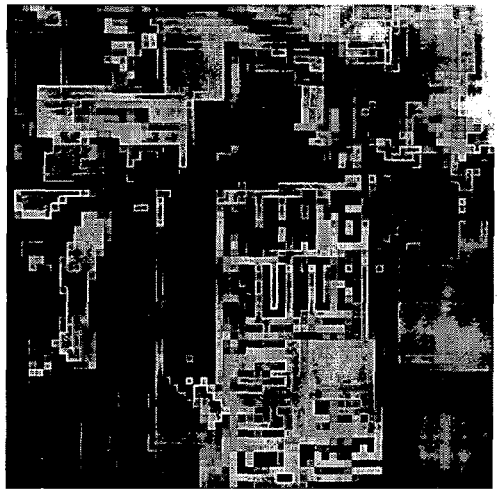
Figure 6B:
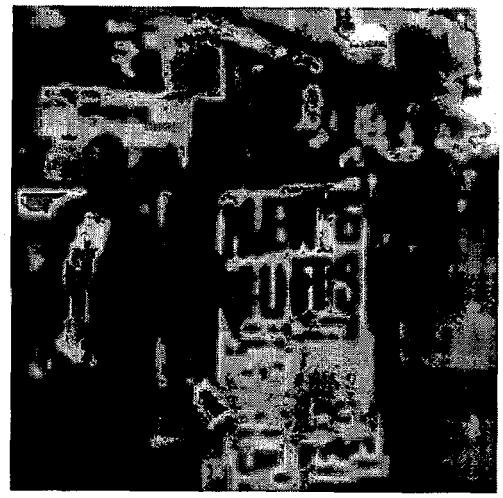
Figure 6C:
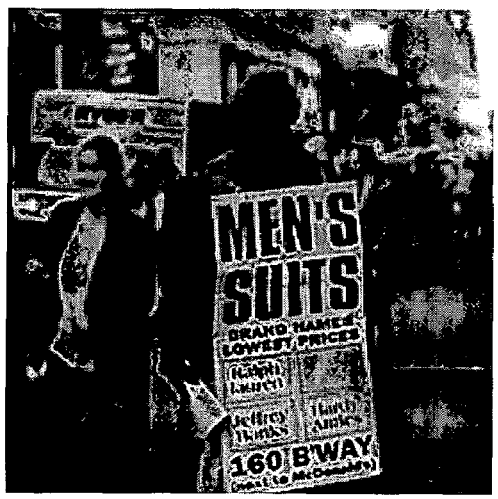
Figure 6D:
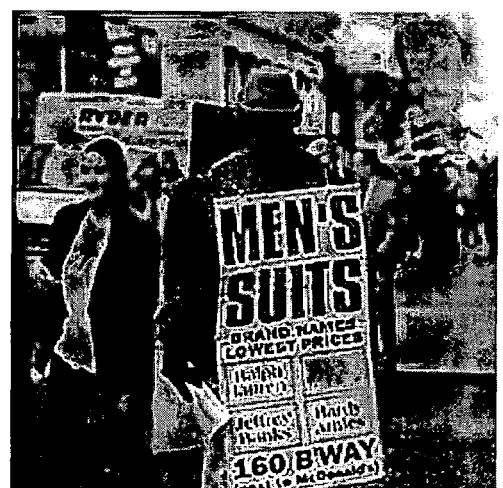

Referring to FIGS. 6A through FIG. 6D, a second case is illustrated. In the second case, an original image is taken as a stationary scene, and is down-sampled by a simulated camera to produce a plurality of low-resolution image sequences. Using the simulated camera, these points on the original image, which the beginning points of the low-resolution images correspond to, are different, i.e., the simulated camera moves when capturing the low-resolution images. Then, the low-resolution images are used to reconstruct an enhanced-resolution image with a magnification factor of 4, in accordance with the method of the invention. FIG. 6A shows one of low-resolution images in the second case. FIG. 6B shows the result after the initial guess phase. FIG. 6C shows the reconstructed image after 100 iterations. FIG. 6D shows the reconstructed enhanced image with a post image process. As shown in FIG. 7, the PSNR between the original image and the reconstructed image in the second case converges rapidly as the number of iterations grows. By the result of FIG. 7, it is evident that the system applying the method of the invention provides well performance.

Figure 8A:
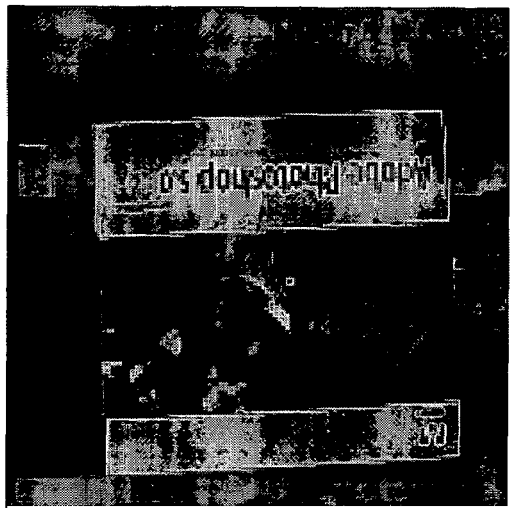
Figure 8B:
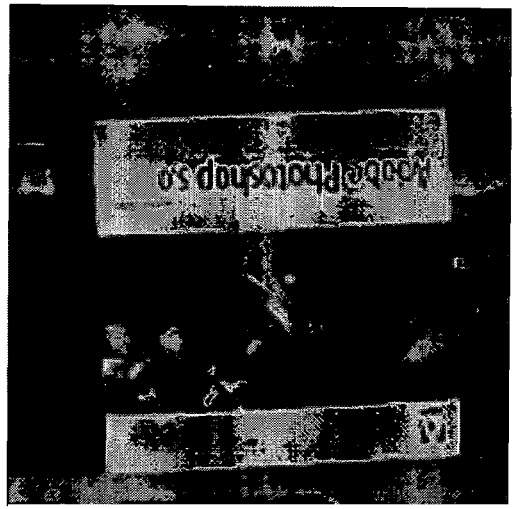
Figure 8C:
Figure 8D:

Referring to FIGS. 8A through FIG. 8D, a third case is illustrated. In the third case, a plurality of low-resolution images, associated with a moving object relative to a stationary background, are used to reconstruct an enhanced-resolution image based on a magnification factor of 2. FIG. 8A shows one of low-resolution image sequences. FIG. 8B shows the result after the initial guess phase. FIG. 8C shows the reconstructed image after 100 iterations. FIG. 8D shows the reconstructed enhanced image with a post image process. From FIG. 8A to FIG. 8D, apparently, as the number of iteration increases, the object becomes more distinct while the background becomes blurry and the edges of words are more discernible.

To sum up the above embodiments and practical cases, the invention provides a method that reconstructs enhanced-resolution images with improved enhanced-resolution algorithms, and employs the suggested initial interpolation, automatic image selection and robust image registration. According to the method of the invention, the reconstruction of enhanced-resolution image can be quickly achieved not only by low-resolution image sequences associated with a stationary scene but also by low-resolution image sequences associated with a moving object. The reconstructed enhanced-resolution images can further perform the post process for enhancing the image quality. Obviously, the method of the invention has the novelty and non-obviousness and satisfies the guideline of patent application.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for producing an enhanced-resolution image by use of M first low-resolution images associated with a scene, M being a natural number larger than 1, each of the M first images being represented by a set of uniformly sampled and quantized pixels, a relationship of a magnification factor existing between the enhanced-resolution image and the M first images, said method comprising the steps of:

(a) storing the M first images;

(b) selecting one from the M first images as a prototype image, and referring the non-selected (M-1) first images to being as (M-1) second images;

(c) based on the magnification factor, interpolating extra pixels into the set of pixels of the prototype image, and then inferring the values of the extra pixels according to the values of neighbor pixels thereof to produce an interpolated prototype image, and calculating a respective translation between each of the (M-1) second images and the interpolated prototype image;

(d) dividing the translations of the (M-1) second images by the magnification factor, respectively, to obtain the modulus with respect to the translations of the (M-1) second images, selecting, based on a criteria, one from the second images whose related modulus are the same, and referring the selected second images together with the rest of the second images whose related modulus are not the same to being as N third images, wherein N is equal to or less than (M-1);

(e) down-sampling the interpolated prototype image N times according to the respective translation between each of the N third images and the interpolated prototype image to produce N fourth images which each corresponds to one of the N third images;

(f) calculating the difference between each of the N third images and the corresponding fourth image thereof;

(g) adjusting the values of the pixels of the interpolated prototype image according to an average of the differences calculated in step (f); and (h) repeating step (e) through step (g), until the values of the pixels of the interpolated prototype image converge to a satisfactory result, and referring the interpolated prototype image whose values of pixels converge to the satisfactory result to being as the enhanced-resolution image;

wherein step (e) is performed according to the following formula:

$$g_k^{(n)} = (T_k(f^{(n)}) \cdot h) \downarrow s,$$

wherein $g_k^{(n)}$ is the kth forth image at the nth down-sampling process, $f^{(n)}$ is the interpolated prototype image been adjusted n times, h is the blurring operator defined by a point-spread-function, $T_k$ is the transformation operator with respect to the translation between the kth third image and the interpolated prototype image, $\downarrow s$ is the down-sampling operator.

2. The method of claim 1, wherein steps (f) and (g) are performed according to the following formula:

$$f^{(n+1)} = f^{(n)} + \frac{1}{K}\sum_{k=1}^{K} T_k^{-1}(((g_k - g_k^{(n)})\uparrow s) \cdot p),$$

wherein $f^{(n+1)}$ is the interpolated prototype image to be adjusted at (n+1) time, K is the number of the third images been calculated, $g_k$ is the kth third image, p is the de-blurring operator, $T_k^{-1}$ is the inverse transformation operator with respect to the translation between the kth third image and the interpolated prototype image, $\uparrow s$ is the up-sampling operator.

3. The method of claim 2, wherein in step (c), the inferring of the values of the extra pixels based on one selected from the group consisting of a first order interpolation, a third order interpolation and a fifth order interpolation.

4. The method of claim 3, wherein in step (c), the translation ($LT_i$) between the ith second image and the interpolated prototype image is calculated according to the following steps:

(c-1) assigning at least one interesting point $P_i(x,y)$ on the ith second image, each interesting point corresponding to a local window (w) and a point (u,v) on the interpolated prototype image;

(c-2) calculating an absolute difference ($LAD_i(x,y;u,v)$) between each interesting point $P_1(x,y)$ and the corresponding point (u,v) thereof according to the following formula:

$$LAD_i(x, y; u, v) = \sum_{(m,n)\in w} |I_i(x+m, y+n) - I_o(u+m, v+n)|;$$

(c-3) calculating a minimum ($LR_i(x,y)$) of the absolute difference $LAD_1(x,y;u,v)$ calculated in step (c-2) according to the following formula:

$$LR_i(x, y) = \underset{(u,v)}{\mathrm{argmin}} LAD_i(x, y; u, v);$$

and (c-4) calculating the translation ($_{LT}i$) with respect to each interesting point $P_i(x,y)$ according to the following formula:

$$LT_i(x,y) = LR_i(x,y) - (x,y) \cdot \text{magnification factor}.$$

5. The method of claim 3, wherein in step (c), the translation ($LT_i$) between the ith second image and the interpolated prototype image is calculated according to the following steps:

(c-1) calculating an absolute difference (GAD(u,v)) with respect to the whole ith second image according to the following formula:

$$GAD_i(u, v) = \sum_{(x,y) \in i} |I_i(x, y) - I_o(u + x, v + y)|,$$

wherein the point (u,v) is a point, on the interpolated prototype image, corresponding to a start point of the ith second image; and (c-2) calculating a minimum (GR(i)) of the absolute difference (GAD(u,v)) calculated in step (c-1) according to the following formula:

$$GR(i) = \arg\min_{(u,v)} GAD_i(u, v),$$

and considering GR(i) as $LT_i$.

* * * * *